(12) United States Patent
Langan et al.

(10) Patent No.: US 8,229,796 B2
(45) Date of Patent: Jul. 24, 2012

(54) AUTOMATED DIRECT BIDS TO PURCHASE ENTERTAINMENT CONTENT UPON A PREDETERMINED EVENT

(75) Inventors: Thomas A. Langan, Seattle, WA (US); Vipul Hingne, Redmond, WA (US); Tian Lim, Seattle, WA (US); Nicholas B. Wild, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 12/200,210

(22) Filed: Aug. 28, 2008

(65) Prior Publication Data

US 2010/0056268 A1    Mar. 4, 2010

(51) Int. Cl.
G06Q 30/00 (2012.01)
A63F 9/24 (2006.01)

(52) U.S. Cl. ............................. 705/26.3; 463/1
(58) Field of Classification Search ................. 705/26
See application file for complete search history.

(56) References Cited

U.S. PATENT DOCUMENTS

| | | | |
|---|---|---|---|
| 6,151,643 A * | 11/2000 | Cheng et al. ................. 710/36 |
| 6,299,535 B1 | 10/2001 | Tanaka | |
| 6,507,727 B1 | 1/2003 | Henrick | |
| 6,697,944 B1 | 2/2004 | Jones et al. | |
| 7,076,445 B1 * | 7/2006 | Cartwright ............... 705/14.12 |
| 7,124,304 B2 | 10/2006 | Bel et al. | |
| 2004/0198403 A1 * | 10/2004 | Pedersen et al. .......... 455/517 |
| 2004/0209691 A1 | 10/2004 | Roush | |
| 2006/0068917 A1 | 3/2006 | Snoddy | |
| 2006/0111188 A1 | 5/2006 | Winkler | |
| 2006/0287099 A1 | 12/2006 | Shaw | |
| 2007/0063433 A1 * | 3/2007 | Ross ............................ 273/236 |
| 2007/0111770 A1 * | 5/2007 | Van Luchene ................ 463/7 |
| 2007/0238499 A1 | 10/2007 | Wright | |
| 2008/0130639 A1 * | 6/2008 | Costa-Requena et al. .... 370/389 |

OTHER PUBLICATIONS

"Business Integration for Games: An Introduction to Online Games and E-Business Infrastructure", Middleware to Enable New Business Models in the Online Games Industry, Oct. 9, 2003, http://www.ibm.com/developerworks/webservices/library/ws-intgame, 12 pages.

"Exceeding the Expectations of Today's Always-On, Always-Connected Student with Palm Handhelds, Mobile Manager & Smartphones", White Paper: The Palm Connected Campus, http://www.palm.com/us/pdfs/2006_Palmcc.WP.pdf, Downloaded from Internet Nov. 24, 2008, 6 pages.

* cited by examiner

Primary Examiner — Calvin L Hewitt, II
Assistant Examiner — Zeshan Qayyum
(74) Attorney, Agent, or Firm — Woodcock Washburn LLP

(57) ABSTRACT

An automated direct transaction and delivery system for digital content ("ATDDC") provides for automated detection of missing digital content or resources required for a player or participant to participate in a multimedia application in either a single player or multiplayer environment is described. The ATDDC automatically detects that a player may not have installed particular required content or that a title update is required in order to participate in a media session or video game. Upon detection of missing content or resources the ATDDC provides direct bid to purchase the content or resources, provides for automatic download, installation and configuration of the content while allowing the player to remain in contact with other players within a party.

17 Claims, 13 Drawing Sheets

281

| Recipient | Party | Event | Cache |
|---|---|---|---|
| Dino | Marauders | New Non-Disk Game Requested Not In Local Storage | No |
| Dino | Marauders | Title Update Required | No |
|  |  |  |  |
|  |  |  |  |
|  |  |  |  |

| Sender | Party | Event | Action |
|---|---|---|---|
| Dino | Marauders | New Non-Disk Game Requested Not In Local Storage | Call Purchase Option, Download and Installation Service Via Party API |
| Dino | Marauders | Title Update Required | Call Title Update Service Via Party API |
| | | | |
| | | | |
| | | | |

FIG. 2D

| UEID | Sender | Recipient | Supporting Data | 241 |
|---|---|---|---|---|
| 242 | 243 | 244 | 245 | |

FIG. 2E

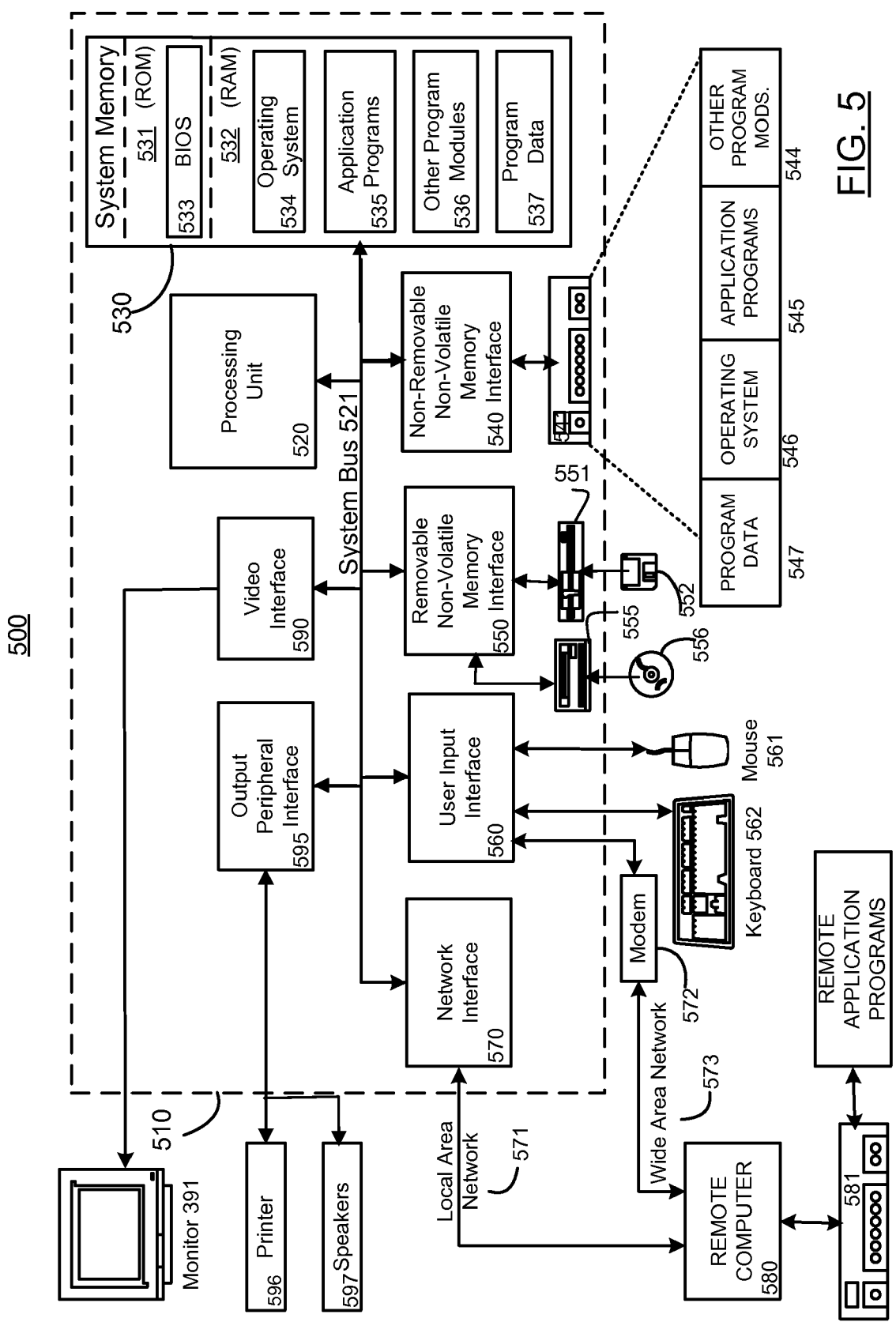

AUTOMATED DIRECT BIDS TO PURCHASE ENTERTAINMENT CONTENT UPON A PREDETERMINED EVENT

BACKGROUND

Computers and gaming systems provide a myriad of entertainment functions including gaming and interpersonal communication. Modern computer games often provide sophisticated multimedia environments involving 3-D graphics and sound to gamers and may allow multiplayer interaction over a network such as the Internet. Gaming enthusiasts typically play computer games on a platform, which may be, for example, a personal computers or dedicated gaming consoles such a the Xbox Video Game Console manufactured by Microsoft Corporation.

As many games allow for or are embellished in a multiplayer environment, it is common for many gamers to establish relationships with other gamers who may share similar interests or preferences. Gamers may request to join various games that are being played by other gamers. Typically this involves sending a request or invitation to a player or players in a game that the gamer desires to join and waiting for an acceptance.

Many games utilize discrete content elements or resources that may be sold separately from the original game title. For example, in a racetrack game, the original game title may include resources to allow a player to race on the 24 Hours Of Lemans circuit in France, the Daytona International Speedway in the United States, The Indianapolis Motor Speedway in the United States, the Fuji Speedway in Japan, the Euro-Speedway in Germany but not the Melbourne Grand Prix Circuit in Australia.

In a multiplayer environment, one or more players may send an invitation to a player to join the racing game. The inviting players may already have purchased the content for the Melbourne Grand Prix Circuit while the invitee may in fact not have this content. Upon being presented with an invitation and attempting to join an ongoing race on the Melbourne Grand Prix Circuit, the invitee would typically be confronted with some type of error notification that he or she did not have the requisite content and resources. The invitee would then be required to back out of the commenced multiplayer session, manually locate the desired content, purchase the content, install the content, relocate the inviting players, prepare his own request to join their game and then join the game that may already be well underway.

The combination of such a complex series of steps to accomplish this task may be highly frustrating and may lead to many players simply abandoning a session to which they have been invited without purchasing the required resources. For the content vendor this may lead to lower sales of content than desired due to the frustration factor.

Based upon the foregoing, there is a clear need a method and system to allow multimedia participants a direct bid to purchase and install required resources contemporaneously with the detection of an event that the content is not available. Such direct to bid system should seamlessly integrate with an already ongoing game session and should be made available to a player without requiring the player to back out of a session that is already underway, thereby allowing nearly continuous game session play without interruption. In addition, such a direct to bid system and method show allow a player to remain in contact and communication with other players previously in contact with during the purchase of the content, throughout installation and continuing through reestablishment of a gaming session with the other players.

SUMMARY

An automated direct transaction and delivery system for digital content ("ATDDC") provides for automated detection of missing digital content or resources required for a player or participant to participate in a multimedia application in either a single player or multiplayer environment is described.

The ATDDC automatically detects that a player may not have installed particular required content in order to participate in a media session or video game. Upon detection of missing content or resources the ATDDC provides direct bid to purchase the content or resources, provides for automatic download, installation and configuration of the content while allowing the player to remain in contact with other players within a party.

According to one embodiment, the ATDDC may be implemented directly as a service or process on a video game system. The ATDDC may function to detect absent content events and upon detection of such events provide a bid to purchase the content to the player, provide for content delivery and installation while maintaining the player's association with other player's within a party. According to this embodiment, the ATDDC may interoperate with a separate party system that maintains state information regarding party affiliation.

According to an alternative embodiment an ATDDC may be directly integrated with a platform wide party system. According to this embodiment, services and functions of an ATDDC may be provided within a party system framework accessible via a party system API ("Application Programming Interface").

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 2C depicts an exemplary recipient event table configured in a reflexive manner to send events relating to detection of missing resources and event title updates from the sender to the sender according to one embodiment.

FIG. 2D depicts an exemplary sender event table adapted to handle events relating to missing resources and/or game title updates in conjunction with the configuration of recipient event table shown in FIG. 2C.

FIG. 2E depicts an exemplary structure of an event message according to one embodiment.

FIG. 5 shows an exemplary computing environment in which aspects of the example embodiments may be implemented.

DETAILED DESCRIPTION OF ILLUSTRATIVE EMBODIMENTS

Figure 1A:
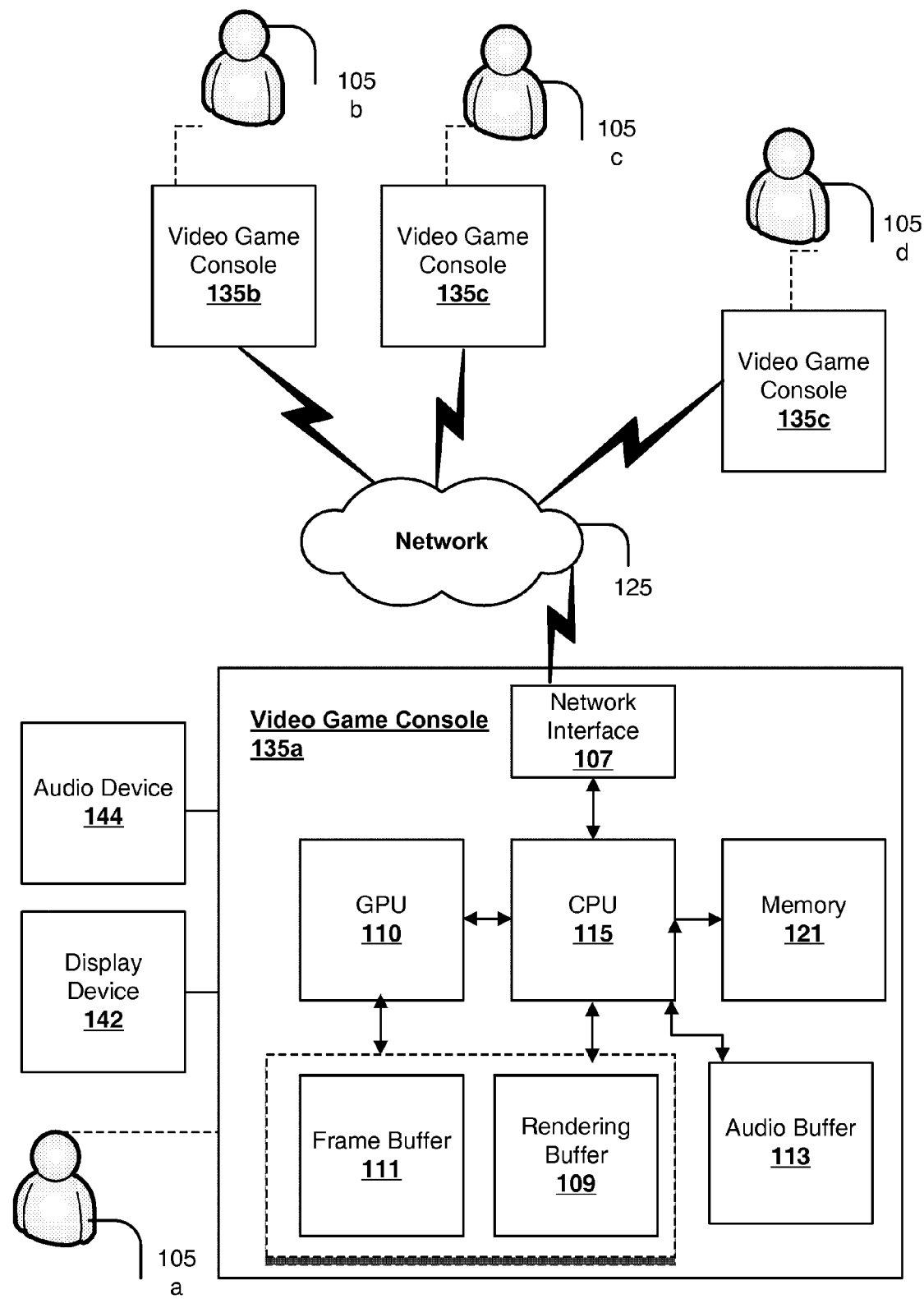
FIG. 1A detects an exemplary environment in which a party system may be deployed.

FIG. 1A detects an exemplary environment in which an ATDDC system may be deployed. An arbitrary number of players 105a-105d may each be associated with a respective video game console 135a-135d. Video game consoles 135a-135d may each provide a platform for hosting a video game for a respective player 105a-105d. A video game also referred to herein as a video game title or title may comprise program instructions, resources, multimedia content involving sound and graphics etc., which when executed on a respective video game console may provide a multimedia video game experience to a user.

A party system (shown and described with respect to FIG. 1B) may be deployed on any of the video game consoles 135a-135d. As described in more detail below, a party system may comprise any number of processes to receive information regarding associations between players and parties, maintain state information regarding players' associations with particular parties, detect events relating to particular game players and allow for communication of selected events between and among game players associated with a particular party even if players within the party are engaged in different game play session.

An ATDDC module may be deployed on any of the video game consoles 135a-135d. As described in more detail below, an ATDDC module may provide services for automated transactions and download of digital content based upon events. Events may comprise a player electing to join a video game session but the player not having requisite digital content or resources for the session installed on his or her video game console.

An expanded view of a video game console 135a on which a participant system may be deployed is also shown in FIG. 1A. Video game console 135a may include network interface 107, GPU ("Graphics Processing Unit") 110 and CPU ("Central Processing Unit") 115. CPU 115 may provide a general-purpose computer that may concurrently execute any number of processes or tasks. Video game titles running on videogame console 135a (not shown in FIG. 1) may each comprise a process or task executed by CPU 115. Memory block 121 may store program instructions and/or data relating to processes or tasks executed by CPU 115. Thus, CPU 115 may retrieve or store data in memory block 121 in order to perform processing. For example, videogame titles may be stored in memory block 121 and CPU 115 may access these instructions.

GPU 110 may provide a specialized and dedicated processor for performing graphics processing and rendering. GPU 110 may utilize frame buffer 111 and rendering buffer 109 in order to perform graphics processing and rendering. Frame buffer 111 may be a video output device that displays a video display from a complete frame of data. Information in frame buffer 111 may comprise color values for every pixel to be displayed on a display device 140. Data in frame buffer 111 may be subject to further processing and rendering by GPU 111 the result of which may be stored in rendering buffer 109. Additional rendering may include personal information of a user 105a.

Audio buffer 113 may store rendered audio data relating to a video game title executing on video came console 135. Data stored in audio buffer may be digital audio samples of audio information.

CPU 110 may interact with network interface 107 to cause information to be transmitted over network 125. In addition, CPU 110 may interact with network interface 107 in order to receive information transmitted over network 125, for example, for other users such as users 105b-105d. Video game console 135a may output rendered video for display on display device 142 and rendered audio for playback on audio device 144.

Figure 1B:
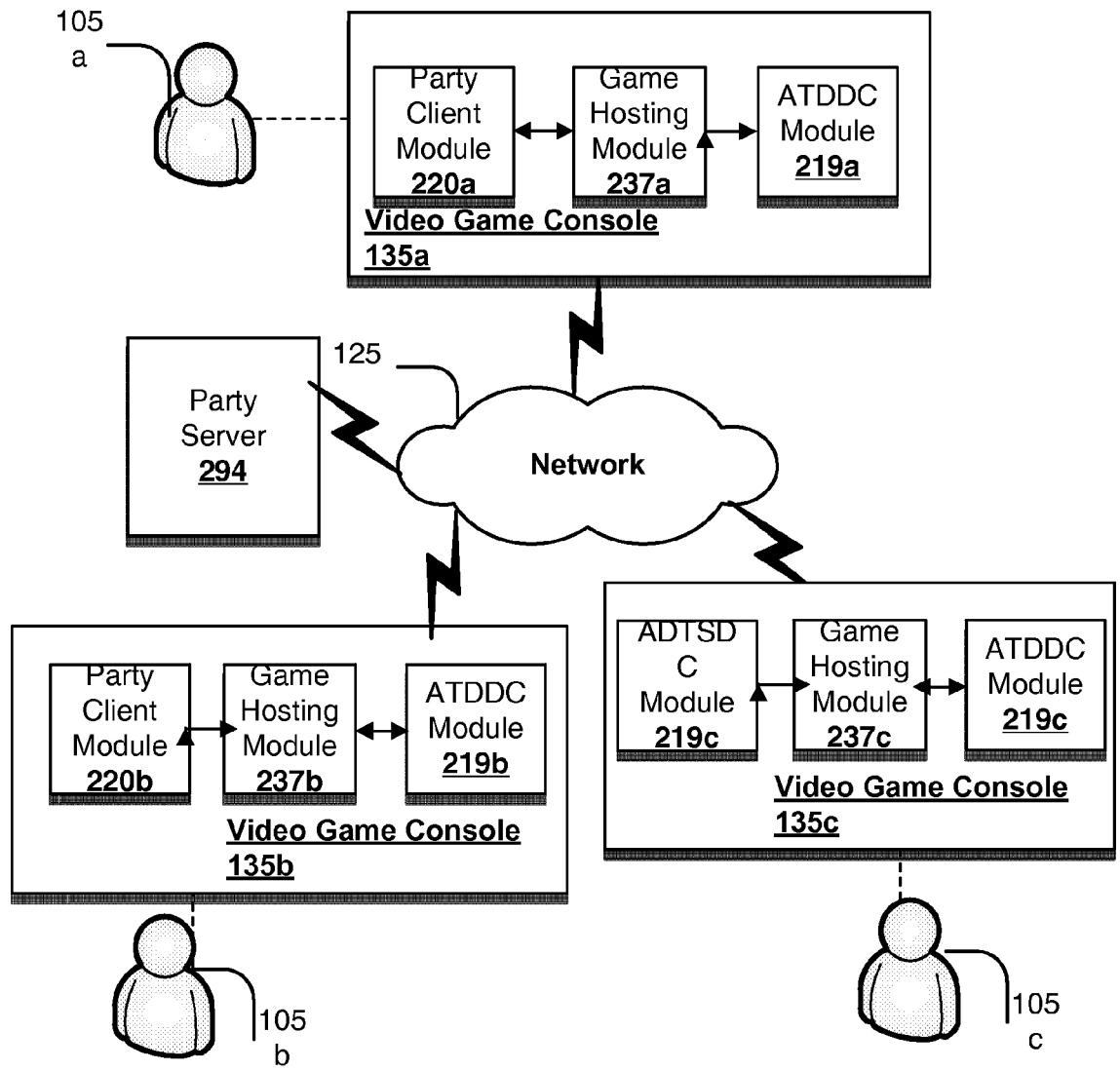
FIG. 1B depicts a deployment of an ATDDC system in a multiplayer gaming environment.

FIG. 1B depicts a deployment of an ATDDC system in a multiplayer gaming environment. Players 105a-105c may respectively use video game consoles 135a-135 to participate in video games, which may include multiplayer video game sessions. Thus, for example players 105a and 105b may respectively use video game consoles 135a and 135b to participate in a multiplayer game session. As shown in FIG. 1B video game consoles 135a-135c and party server 294 are coupled to network 125 and may communicate with one another via network 125.

Game hosting modules 237a-237c may be respectively deployed on each video game console 135a-135c. Each game hosting module 237a-237c may provide services to allow a respective player (i.e., 105a-105c) to participate in a single player or multiplayer video game session. The services may be made available via an API ("Application Programming Interface"), which is not depicted in FIG. 1B. For example, game hosting modules 237a-237c may each provide services for low level support for a video game session such as APIs for interacting with graphics hardware, loading a desired video game from a library, establishing network connections with other players in a multiplayer session, saving and retrieving state information regarding video games in progress, etc.

A party system may be deployed in the multiplayer environment shown in FIG. 1B comprising the aggregate collection of a plurality of party client modules 220a-220c and party server 294. In particular, a party client module 220a-220c may be deployed on each respective video game console 135a-135c. As described in detail below, each party client module 220a-220c may perform services including detecting events related to respective users 105c105c including events related to game play as well other events that relate to the state of a player within an online session. Other events may include, for example, a player's logging onto party server 294, a party navigating a menu system, etc. Party server 294, as described in detail below, may maintain state information regarding game players' associations with particular parties, game player preferences, etc. In addition, party server 294 may from time to time update party client processes 220a-220c using the state information as described below.

ATDDC modules 219a-219c may be respectively installed on video game consoles 135a-135c. ATDDC modules 219a-219c may provide services for automated transactions and download of digital content based upon detection of an event, which may include detection that a particular player does not have installed requisite content or resources to participate in a particular media session or video game. ATTDDC modules 219a-219c may interoperate concurrently with party client modules 220a-220c so that players may remain in contact and communication with other players in an associated party during a transaction, download, installation and configuration of requisite resources.

Figure 1C:
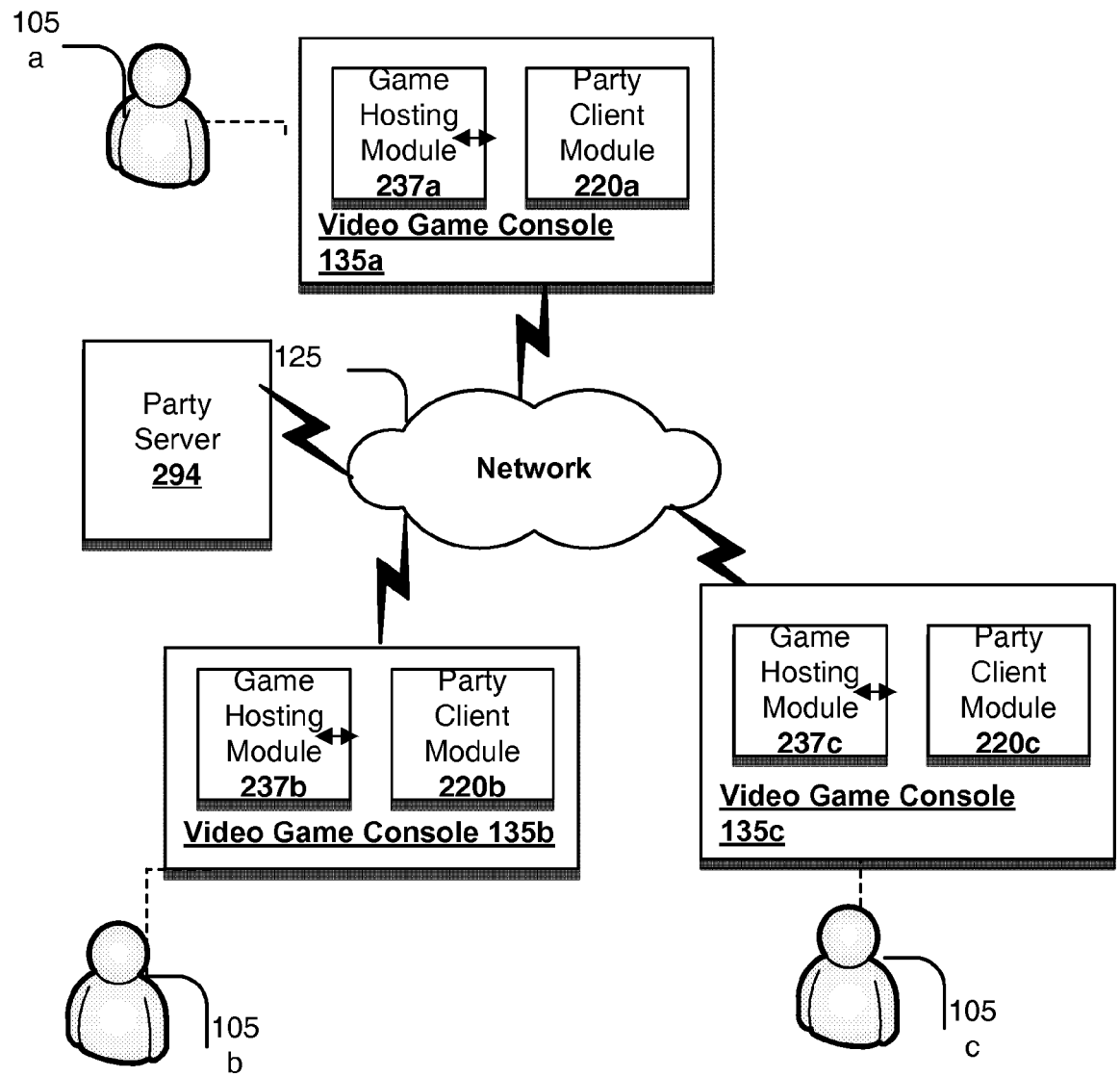
FIG. 1C depicts deployment of a party client module in a multiplayer gaming environment.

According to an alternative embodiment, as shown in FIG. 1C, ATDDC functionality may be achieved in an integrated manner with a party system and without a separate ATTDDC.

According to this alternative embodiment, a party client module 220a-220c may provide event messaging and event handling capabilities via an integrated architecture and API that may allow the automated transaction and download of digital content upon detection of a predetermined event while a player remains connected and otherwise in communication with other players within a party. An exemplary embodiment of the use of a party system messaging passing and event handling capabilities in this regard is described in detail below.

Figure 1D:
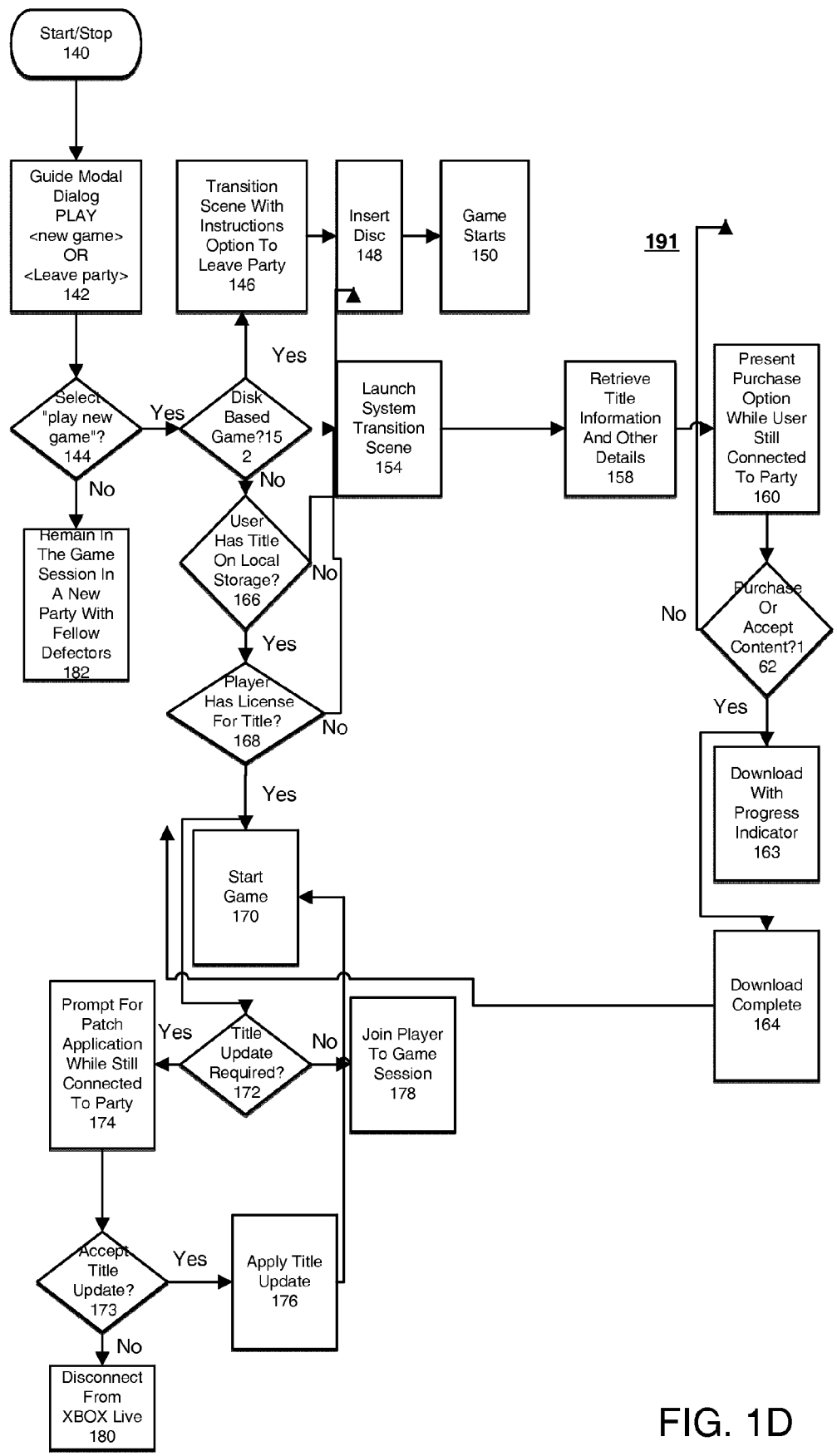
FIG. 1D depicts an exemplary player title switch flow that may be executed by an ATDDC module according to one embodiment.

FIG. 1D depicts an exemplary player title switch flow that may be executed by an ATDDC module according to one embodiment. According to one embodiment an ATDDC may monitor events occurring in a game hosting module 237 in order to cause execution title switch workflow 191 such as that shown in FIG. 1D. According to one embodiment, an interrupt may set to cause the execution of player title switch flow 191 based upon events occurring on a processor of a video game console. Alternatively, events may be monitored by a party client module instead causing execution of title switch workflow upon the detection of particular events such as missing content or resources, a required game title update, etc. It is recognized that many embodiments are possible to detect missing resource events and other conditions related to title switch workflow 191, and this description is compatible with any such alternative embodiment.

According to this illustrative example, it is assumed that a player is currently in a game session with one or more other players from a first party and may desire to join another party he or she is associated with in order to play a second game with players of the second party. The process is initiated in 140. In 142, a player may be presented with a modal dialog box requesting a decision whether the player desires to play a new game or leave the current party the player is associated with.

In 144, it is determined whether the player desires to play a new game or leave the current party. If the player desires to join a different party but remain in the same game ('No' branch of 144), in 182 the player remains in the current game within a new party with fellow defectors. This may be achieved via a party system and party system API as described below.

If the player desires to play a new game ('Yes' branch of 144), flow continues with 152 and it is determined whether the title of the new game is a disk-based game. If so ('Yes' branch of 152) in 146, a transition scene is provided to the player with instructions and an option to leave the current party the player is connected to. Then, in 146, the player prompted to insert a disk and game play starts in 150.

Otherwise, if the title is not a disk-based game ('No' branch of 152), flow continues with 166 and it is determined whether the player has the desired title on local storage. If not ('No' branch of 166) flow continues with 154. If the player does have the title ('Yes' branch of 166) flow continues with 168 and it is determined whether the player has a license for the title. If so ('Yes' branch of 168) flow continues with 170 and the game is commenced. If not ('No' branch of 168) flow continues with 154 and a system transition scene is presented. In 158, title information and other details are retrieved.

In 160, a purchase option is presented to the player while the player is still connected to other players in an associated party. In 162, it is determined whether the user purchases or accepts the content. If not ('No' branch of 162) flow continues with 160 and the player is again presented with a purchase option. If so ('Yes' branch of 162) flow continues with 163 and a download of the desired content is commenced. The download is completed in 164.

In 170 the game commences. In 172, it is determined whether a title update is required. If not ('No' branch of 172) the player is joined to the game session in 178. If so ('Yes' branch of 172), in 174 the player is prompted for a patch application while concurrently connected to other players in the party. In 173, it is determined whether the player accepts the title update. If not ('No' branch of 173), in 180 the player is disconnected from the live session, for example and Xbox live session. If so ('Yes' branch of 173), in 176 the title update is applied and the game commenced in 170.

According to one embodiment, automated transaction and download functionality may be implemented utilizing event detection and event message passing provided by a party client module 220 alone without a separate ATDDC. A party client module and its function within a party system including a party server 294 are now described.

Figure 2A:
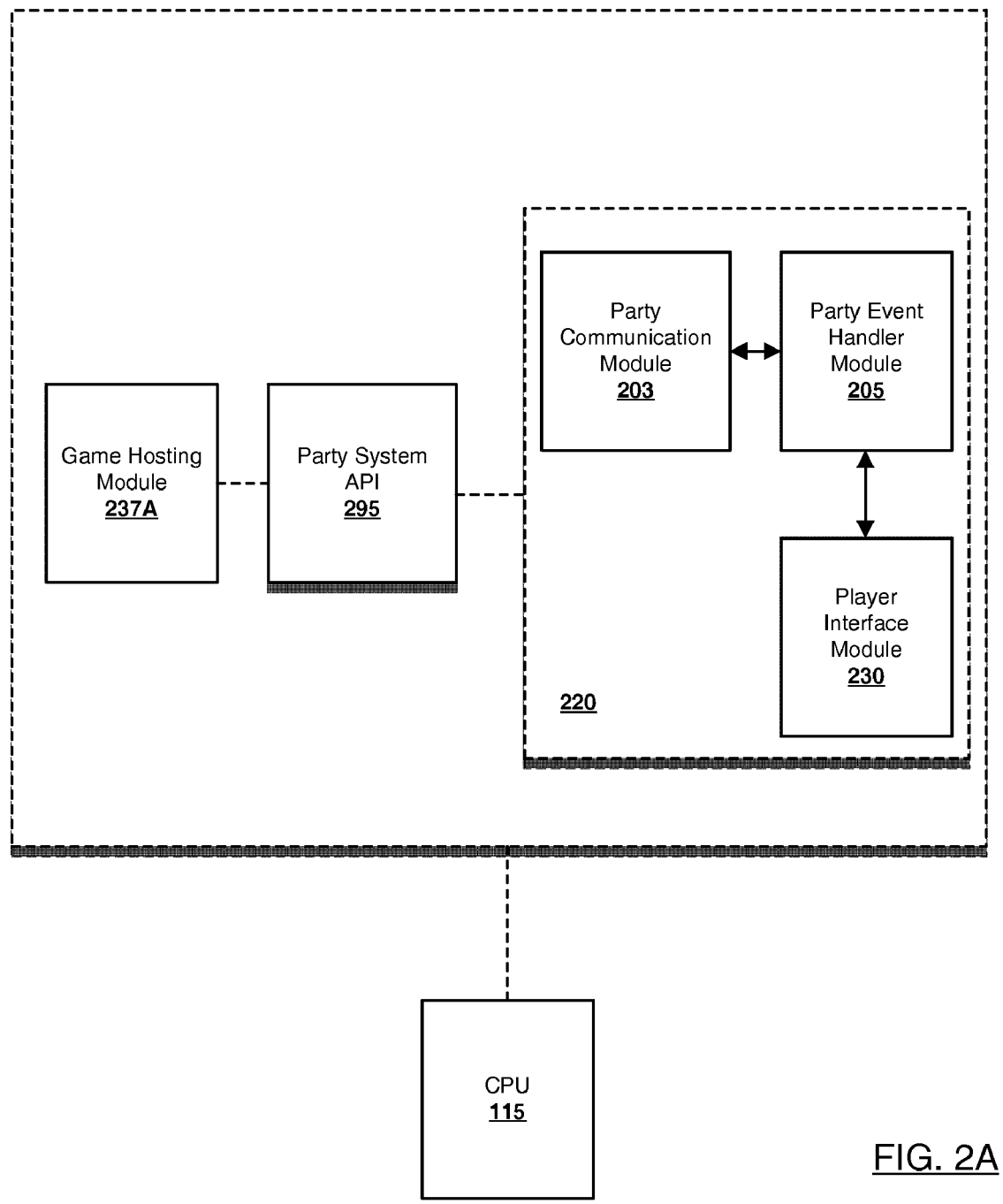
FIG. 2A depicts an exemplary architecture of a party client module 220 according to one embodiment.

FIG. 2A depicts an exemplary architecture of a party client module 220 according to one embodiment. Game hosting module 237A may be deployed to execute on CPU 115. Party client module 220 may also be deployed to execute on CPU 115. Party client module 220 may comprise party communication module 203, party event handler module 205 and player interface module 230. Game hosting module 237A may invoke services and function of party client module 220 via party system API 295, which is described in more detail below. Thus, games executing via game hosting module 237A may call services and functions of party client module 220 via party system API 295 in order to invoke these services with tight integration with game play. Further, using the arrangement shown in FIG. 2A, services provided by party client module may be available within games running via game hosting module 237A without requiring players to exit a running game before executing the services.

Party client module 220 may comprise party communication module 203, party event handler module 205 and player interface module 230. Party event handler module 205 may perform functions to detect events occurring on a video game console on which party client process is executing. Events may comprise events occurring in video games executing via game process 210 or other events relating to the state of the player using the video game console. For example, state events may comprise events relating to the player's logging onto party server 294, navigating various administrative menus, changing preference information, electing to join a particular multiuser game session, etc. Depending on the nature of detected events, party event handler module 205 may perform certain functions including notifying other players of the occurrence of the events.

Party communication module 203 may perform functions to transmit information over a network and receiving information from a network. Thus, for example, upon receiving notification of a relevant event, party event handler module 205 may transmit information regarding the event to party communication module 203 in order to cause the transmission of the event over a network to a relevant party. On the other hand, party communication module 203 may also receive notification of events generated by other players in a multiplayer environment and transmit those notifications to party event handler module for processing 205. An exemplary process executed by a party communication module both for detection of events and processing of received events is described in detail below.

Player interface module 230 may perform functions to display a graphical user interface ("GUI") to players. Exemplary information that may be displayed on a GUI may include information regarding relevant events generated by other players. According to one embodiment, this information may be displayed seamlessly with a game play screen. An exemplary GUI is described in detail below.

Figure 2B:
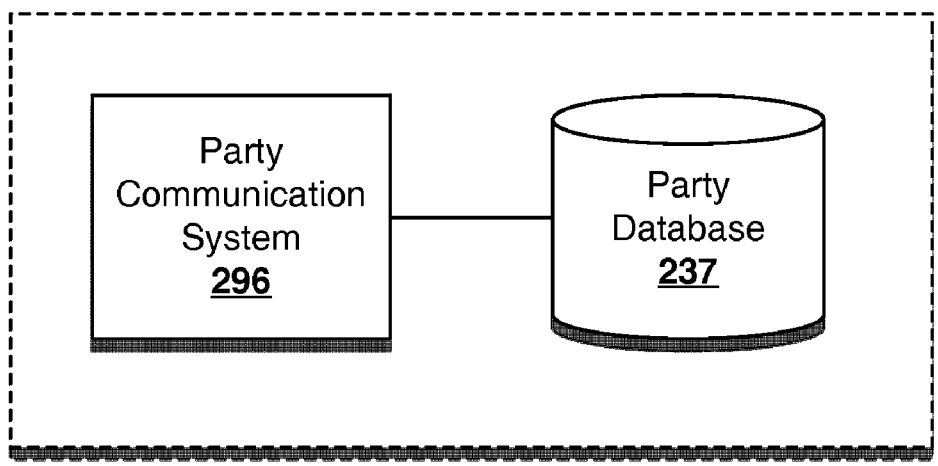
FIG. 2B depicts an exemplary architecture of a party server according to one embodiment.

FIG. 2B depicts an exemplary architecture of a party server according to one embodiment. Party server 294 may comprise party communication system 296 and party database 237. Party database 237 may store state information regarding particular players including their party affiliations, online/offline status, etc. An exemplary schema of a party database 237 is described below. Party communication system 294 may perform functions to establish communications with game players including transmission of state information regarding players to other players in an associated party. For example, party communication system 294 may transmit the online or offline status of particular players to other players of a party with which the player is associated.

FIG. 2C depicts an exemplary recipient event table configured in a reflexive manner to send events relating to detection of missing resources and event title updates from the sender to the sender according to one embodiment. According to one embodiment, players acting as recipients may subscribe to events from other players they wish to know about. Event subscription may be accomplished by sending a request to the player for whom particular event notifications are requested. Recipient event table 281 may be stored locally on a video game console associated with a user and utilized by party event handler module 205 running on that video game console to determine events of the player to transmit to other players, herein referred to as recipients. According to one embodiment, event action table 281 may comprise recipient column, party column, event column and cache column. Recipient column may store identifiers of players that have been designated as recipients to receive particular events. Party column stores a name of an associated party for a recipient. Event column stores a particular event to transmit to a recipient. As will be described below, an event may be transmitted in a specific format herein referred to as an event message. Cache column stores a binary value indicating whether the event should be cached locally if the recipient is not online when the event is generated.

Although recipient event table 281 may be configured generally to detect events between players in accordance with the general implementation of a party system, it may be utilized to detect events on a video game console and pass messages regarding those events to an event handler running on the same machine. This embodiment obviates the need for a separate ATDDC module to detect missing resource events. Event detection may be effected by a party client module by monitoring events occurring on a game hosting module or having an interrupt set to call a particular event handler module of the party client module upon occurrence of an event.

Also, because the detection and event handling is performed via a party system and corresponding party client module, players may remain connected to one another during the execution of a bid to purchase, download and install content relating to games currently under way. Thus, players are not required to disconnect from one another before completing a purchase, downloading content or installing content.

It is assumed for purposes of this discussion that the exemplary event table 281 shown in FIG. 2C belongs to a hypothetical player Dino and may be stored locally on his video game console. According to this example, Dino who is a member of the party Marauders has been designated to receive an event message when a new non-disk game is requested that does not exist in local storage. Note that Dino is both the sender and recipient of this event. Similarly, Dino is also designated to receive an event message upon detection of a title update.

FIG. 2D depicts an exemplary sender event table adapted to handle events relating to missing resources and/or game title updates in conjunction with the configuration of recipient event table shown in FIG. 2C. Sender event table may comprise sender column, party column, event column and action column. Sender column my store the name of a sending player. Party column may store the name of an associated party for each sending player. Event column stores information regarding a type of incoming event that may be received from a corresponding player. Action column may store an action to be undertaken with respect to a particular incoming event received from a player.

According to one embodiment, actions may be undertaken by party event handler module 205 as described below. In particular, in order to undertake an action, a function or service implemented by party system API 295 may be called using that API. As described in more detail below, party system API 295 may provide services for player notification, initiation of communication sessions between players, automated invitations for players to join particular games. In general, any action may be automated and made available via a function or service available through party system API in order to execute the action. In addition, a scripting functionality may be provided to allow the combination of multiple actions and thereby multiple calls via party system API 295.

For purposes of this discussion, it is assumed that sender event table 282 belongs to the hypothetical player Dino, discussed with reference to FIG. 2C. According to this example, upon receiving an event notification generated by Dino that a new non-disk game request for a game not in local storage has occurred, a bid to purchase option, download and installation service may be called. These services may perform functions similar to the title switch flow shown in FIG. 1D. The purchase to bid service, download and installation services may be separate API calls or integrated into a single call. Similarly, upon detection of a title update a title update service may be executed via a corresponding API call.

FIG. 2E depicts an exemplary structure of an event message according to one embodiment. Event message 241 may comprise unique event identifier field ("UEID") 242, Sender field 243, Recipient field 244 field and Supporting Data field 245. UEID field 242 may store a unique identifier of an event in the message. According to one embodiment, a master table of event types may be generated and a UEID assigned to each event type. Sender field 243 may store an identifier of the sender of the event. Recipient field 244 may store a unique identifier of the intended recipient of the event message. Supporting Data field 245 may store any additional data that may assist an event handler at the recipient in interpreting the event or carrying out an associated action in response to receiving the event message.

Figure 3:
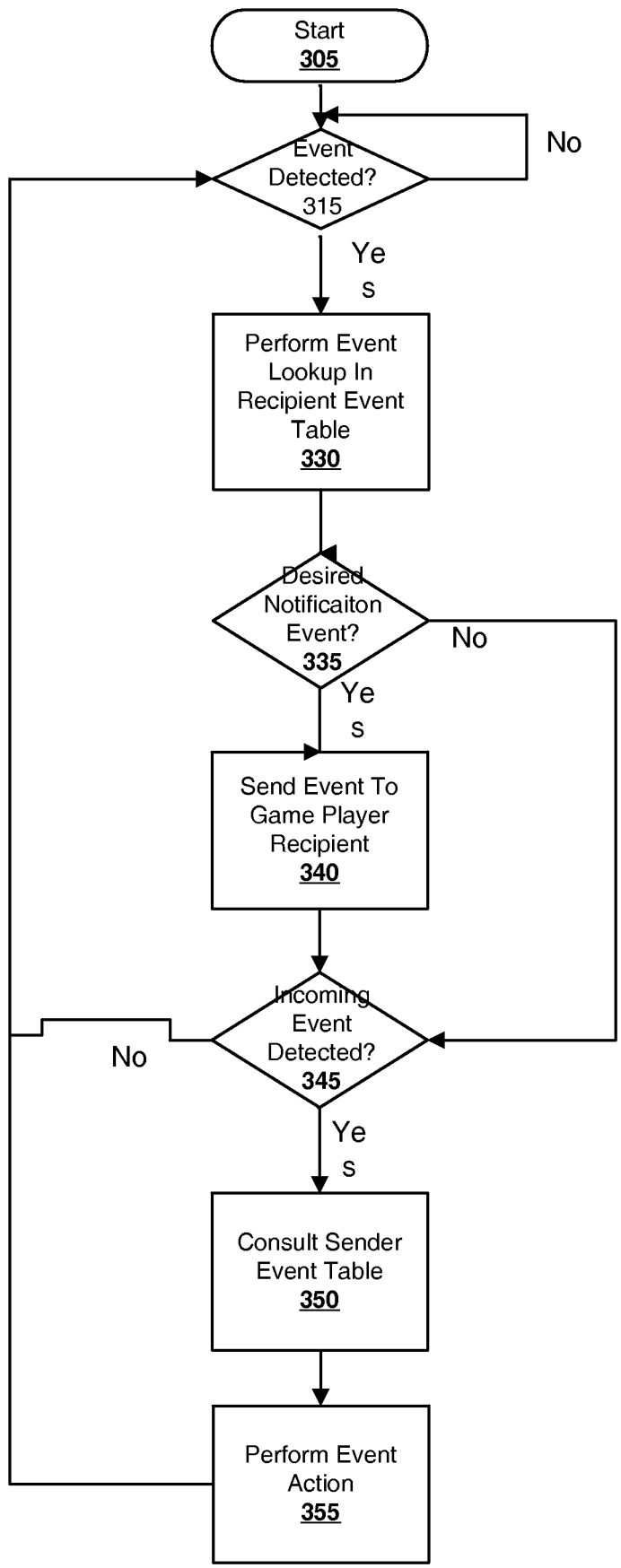
FIG. 3 is a flowchart of a process that may be performed by a party event handler module.

FIG. 3 is a flowchart of a process that may be performed by a party event handler module. The process is initiated in 305. In 315, if an event is not detected ('No' branch of 315), flow continues with 315. If an event is detected in 315 ('Yes' branch of 315), flow continues with 330 and the detected a recipient event table on the video game console is consulted to determine whether the detected event is one for which a recipient has requested notification. In 335, if the detected event is not a desired notification event ('No' branch of 335), flow continues with 345. If the event is a desired notification event ('Yes' branch of 335), flow continues with 340 and an event message is created and sent to the intended recipient(s) as determined from the recipient event table.

In 345, it is determined whether an incoming event has been received from a sender. If not ('No' branch of 345), flow continues with 315. If so ('Yes' branch of 345) flow continues with 350 and the sender event table is consulted to look up the received event. In 355, the action corresponding to the event as determined from the sender event table is performed. Flow then continues with 315.

Figure 4A:
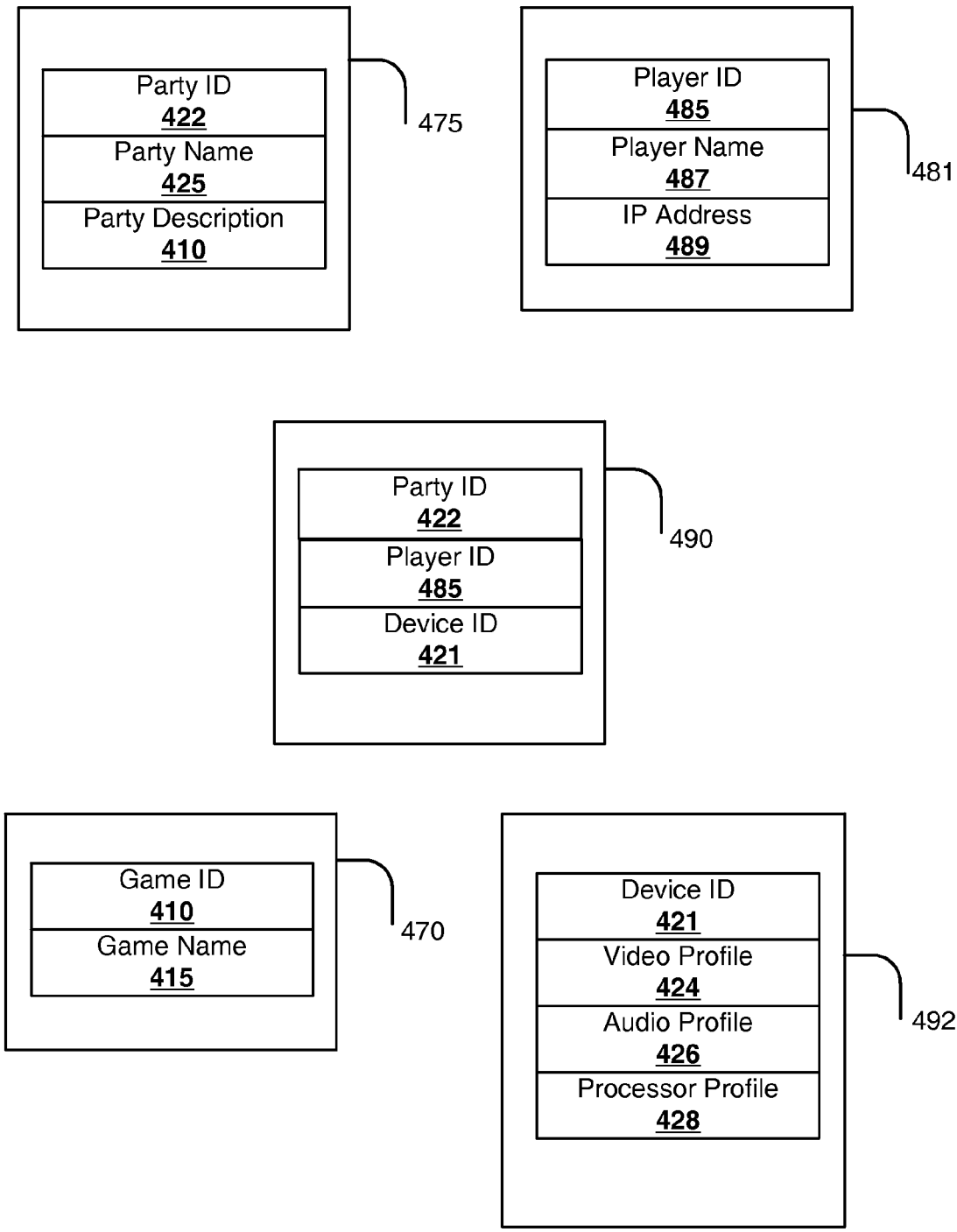
FIG. 4A depicts an exemplary schema of a party database that may be stored at a party server.

FIG. 4A depicts an exemplary schema of a party database that may be stored at a party server. According to one embodiment party database 237 may comprise party table 475, player table 481, party-player association table 490, game table 470 and device table 492. In general, party database 237 may store any information related to a party system. According to one embodiment, information regarding the current state of a player with respect to games he or she is currently playing is stored locally and the respective video game console. However, according to alternative embodiments this information may be stored at the party server within party database 237.

Party table 475 may comprise party ID field 422, party name field 425 and party description field 410. Party ID field 422 may store a unique identifier for a party. Party name field 425 may store a unique name for a party. Party description field 410 may store a description of a party.

Player table 481 may comprise player ID field 487, player name field 487 and IP address field 489. Player ID field may store a unique identifier of a player. Player name field 487 may store a name for a player associated with a player ID stored in player ID field 487. IP address field 489 may store an IP address of a player that has logged onto party server 294. In the case that the player is not logged on, IP address field 489 may be set to NULL.

Device table 492 may comprise device ID field 421, video profile field 424, audio profile field 426 and processor profile field 428. Device ID field 421 may store a unique identifier of a device and in particular a video game console. Video profile field 424 may store information indicating an associated video profile and capabilities for the device. Audio profile field 426 may store information indicating an associated audio profile and capabilities for a device. Processor profile field 428 may store information indicating a processor profile of a device.

Party player association table 490 may comprise party ID field 422, player ID field 485 and device ID field 421. Thus, in order to associate a player with a particular party and device, corresponding entries in a player association table 490 may be created. According to one embodiment a single player may be associated with more than one party and/or multiple players may be associated with a single device.

Game table 470 may comprise game ID field 410 and game name field 415. Game ID field 410 may store a unique identifier of a video game. Game name field may store a name of a video game associated with a game ID stored in game ID field 410.

Figure 4B:
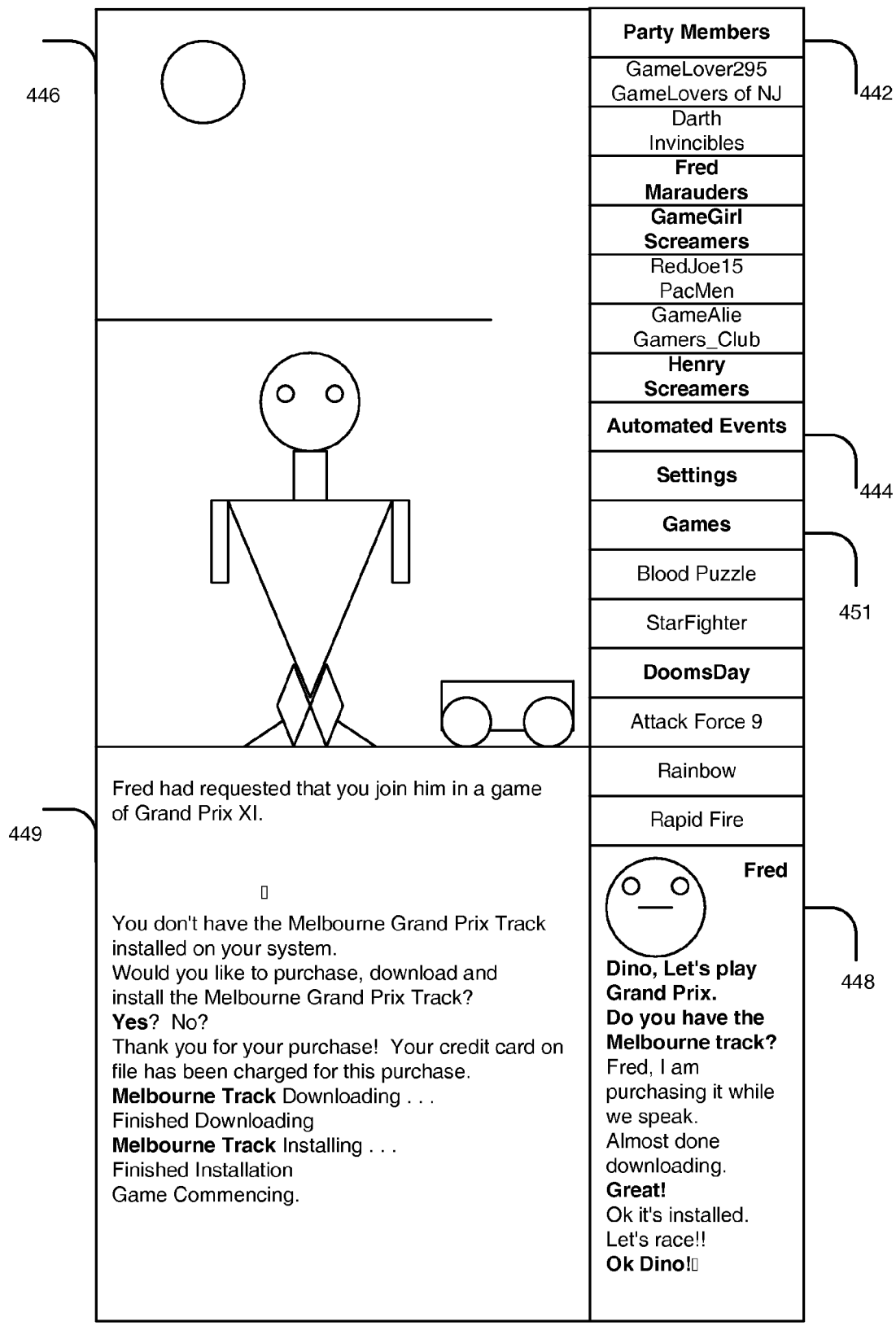
FIG. 4B depicts an exemplary GUI for integrated presentation of game play, inter-player communications, and direct bid to purchase, download and installation information.

FIG. 4B depicts an exemplary GUI for integrated presentation of game play, inter-player communications, and direct bid to purchase, download and installation information. GUI 461 may be generated and displayed by a player interface module 230 running on a video game console associated with a game player. GUI 461 may comprise game play pane 446, party members pane 442, automated events selection button 444, games pane 451, video chat pane 448 and text event notification pane 449.

In particular, GUI 461 may display bid to purchase options, execution of download and installation progress for missing content simultaneous with game play information and communication information with respect to other players in an associated party. Thus, a player required to install new content in order to participate in a game session with another within an associated player may remain in communication with the other player and is not otherwise required to disconnect from that player while the purchase, download and installation is completed.

Referring to FIG. 4B, game play pane 446 may present game play action for a current game that a player is currently playing. Party members pane 442 may show other players and their respective online/offline status (indicated in bold) along with their associated party. Thus, according to the example shown in FIG. 4B, gamers GameLover295, Darth, Dino, GameGirl, RedJoe15, GameAlie and Henry are all players associated with the player. Dino and GameGirl are currently online. As shown in FIG. 4B associated players may belong to different parties as noted because a player may be associated with multiple parties. Automated events selection button 444 may allow a player to initiate a selection of events the player desires to be notified of with respect to other players and may cause the initiation of an additional GUI for selection of these event. Games pane 451 may show current games installed on the associated video game console. Video chat pane 448 may allow for a video and audio chat session with a player even if that that player is not currently in a multiplayer game session with the associated game player. For example, a video and text chat with Fred may be ongoing with game play and concurrently with purchase, download and installation of missing content as shown in FIG. 4B.

Event notification pane 449 may display textual indicators of events that the associated player has subscribed to with respect to other players. These event notifications may be displayed to the associated player without requiring the player to exit the current gaming session. In particular, event notification pane may display prompts and update information to a player regarding missing content, the progression of a download and/or installation of missing content. For example, as shown in FIG. 4B, Dino is prompted that Fred would like to play Grand Prix XI. Upon detection that Dino is missing the content and resources for the Melbourne Grand Prix Track, Dino is presented with a bid to purchase the Melbourne track content and resources. Dino elects to purchase the content and is presented with an indicator that his credit card has been charged and a download and installation has successfully completed.

Continuing with the example GUI 461 shown in FIG. 4B, Dino remains in contact and communication with Fred during the purchase, download and installation of missing content for Grand Prix XI. According to this example, Dino's comments are shown in plain font while Fred's responses are shown in bold. Fred asks Dino to play and whether he has the content. Dino responds that he is currently purchasing the content and keeps Fred apprised of the download and installation. Upon completion the player's comment further and game play commences.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 6 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

What is claimed:

1. A method for sale and delivery of media content in a multiplayer gaming environment, the multiplayer gaming environment having a plurality of players, each player associated with a video game console, comprising:

detecting, by one or more computing devices, an invitation from an inviting player to establish a multiplayer game session with an invitee player, wherein the inviting player and the invitee player belong to a party in which respective video game consoles associated with the inviting player and the invitee player are in communication with one another and the multiplayer game session requires at least one resource;

receiving by the one or more computing devices, an acceptance by the invitee player; and based on the acceptance, establishing by the one or more computing devices, a communication between the video game console associated with the inviting player and the video game console associated with the invitee player;

detecting by the one or more computing devices, that the invitee player does not have at least one required resource to participate in the multiplayer game session; and based on the detecting, maintaining by the one or more computing devices, communication between the respective video game consoles associated with the inviting player and the invitee player while concurrently:

providing, by the one or more computing devices, a bid to the invitee player to purchase the at least one required resource;

receiving, by the one or more computing devices, an acceptance by the invitee player to purchase the at least one required resource; and based on the receiving of the acceptance by the invitee player to purchase the at least one required resource:

automatically downloading, by the one or more computing devices, the at least one required resource to the video game console associated with the invitee player;

automatically installing, by the one or more computing devices, the at least one required resource on the video game console associated with the invitee player; and initiating, by the one or more computing devices, the multiplayer game session between the respective video game consoles associated with the inviting player and the invitee player.

2. The method of claim 1, wherein each video game console is coupled to a network.

3. The method of claim 2, wherein the invitation is received from the inviting player over the network.

4. The method of claim 1, further comprising:

if, upon initiating the video game session, it is detected that a title update is required:

displaying a prompt to the invitee player to update a game title;

upon receiving an acceptance of the game title update, maintaining communication between the inviting player and invitee player while concurrently:

downloading the game title update;
installing the game title update.

5. The method of claim 4 further comprising displaying a GUI ("Graphical User Interface") comprising a first pane for displaying game play information, a second pane for displaying the bid to purchase, download progress information and installation progress information and a third pane for displaying communication information including video information between the inviting player and the invitee player.

6. The method of claim 5, wherein the second pane is a message pane utilized by a party system to display message events.

7. The method of claim 1, wherein detecting that the invitee player does not have at least one required resource to participate in the multiplayer game session, further comprises:
  setting a recipient notification of the invitee player to correspond to the invitee, wherein the recipient notification is configured to detect a missing resource event; and
  setting an action associated with a missing event message to cause the execution of a service to perform a direct bid to purchase, install and download the required missing resource.

8. The method of claim 7, further comprising accessing the service via an API function call associated with a party system.

9. A system for the sale and delivery of media content in a multiplayer gaming environment, the multiplayer gaming environment having a plurality of players, each player associated with a video game console, comprising:
  a processor that executes processor-executable instructions to:
    detect an invitation from an inviting player to establish a multiplayer game session with an invitee player, wherein the inviting player and invitee player belong to a party in which respective video game consoles associated with the inviting player and the invitee player are in communication with one another and the multiplayer game session requires at least one resource;
    upon detecting an acceptance by the invitee player, establish a communication between the video game console associated with the inviting player and the video game console associated with the invitee player;
    upon detecting that the invitee player does not have at least one required resource to participate in the multiplayer game session, maintain communication between the respective video game consoles associated with the inviting player and the invitee player while concurrently:
      providing a bid to the invitee player to purchase the at least one required resource; and
      upon receiving an acceptance by the invitee to purchase the at least one required resource:
        automatically downloading the at least one required resource to the video game console associated with the invitee player;
        automatically installing the at least one required resource on the video game console associated with the invitee player; and
        initiating the multiplayer game session between the respective video game consoles associated with the inviting player and the invitee player.

10. The system of claim 9, wherein each video game console is coupled to a network.

11. The system of claim 10, wherein the invitation is received from the inviting player over the network.

12. The system of claim 10, wherein the processor is further adapted to:
  if upon initiating the video game session, it is detected that a title update is required:
    display a prompt to the invitee player to update a game title;
    upon receiving an acceptance of the game title update, maintaining communication between the inviting player and invitee player while concurrently:
      downloading the game title update;
      installing the game title update.

13. The system of claim 12, wherein the processor is further adapted display a GUI ("Graphical User Interface") comprising a first pane for displaying game play information, a second pane for displaying the bid to purchase, download progress information and installation progress information and a third pane for displaying communication information including video information between the inviting player and the invitee player.

14. A system for the sale and delivery of media content in a multiplayer gaming environment, the multiplayer gaming environment having a plurality of players, each player associated with a video game console, comprising:
  a processor that executes processor-executable instructions;
  a memory having stored therein the processor-executable instructions that, when executed by the processor, causes the processor to perform the steps of:
    detecting an invitation from an inviting player to establish a multiplayer game session with an invitee player, wherein the inviting player and invitee player belong to a party in which respective video game consoles associated with the inviting player and the invitee player are in communication with one another and the multiplayer game session requires at least one resource;
    receiving an acceptance by the invitee player; and
    based on the acceptance, establishing a communication between the video game console associated with the inviting player and the video game console associated with the invitee player;
    detecting that the invitee player does not have at least one required resource to participate in the multiplayer game session; and
    based on the detection, maintaining communication between the respective video game consoles associated with the inviting player and the invitee player while concurrently:
      providing a bid to the invitee player to purchase the at least one required resource;
      receiving, by the one or more computing devices, an acceptance by the invitee player to purchase the at least one required resource; and
      based on the receiving of the acceptance by the invitee player to purchase the at least one required resource:
        automatically downloading the at least one required resource to the video game console associated with the invitee player;
        automatically installing the at least one required resource on the video game console associated with the invitee player; and
        initiating the multiplayer game session between the respective video game consoles associated with the inviting player and the invitee player.

15. The system of claim 9, wherein detecting that the invitee player does not have at least one required resource to participate in the multiplayer game session, further comprises:

setting a recipient notification of the invitee player to correspond to the invitee player, wherein the recipient notification is configured to detect a missing resource event; and setting an action associated with a missing event message to cause the execution of a service to perform a direct bid to purchase, install and download of the required resource.

16. The system of claim 15, wherein the service is accessed via an API function call associated with a party system.

17. A computer readable storage medium for the sale and delivery of media content in a multiplayer gaming environment, the multiplayer gaming environment having a plurality of players, each player associated with a video game console, the computer readable storage medium having stored thereon computer executable instructions that, when executed by a computer, causes the computer to perform the steps of:

detecting an invitation from an inviting player to establish a multiplayer game session with an invitee player, wherein the inviting player and invitee player belong to a party in which respective video game consoles associated with the inviting player and the invitee player are in communication with one another and the multiplayer game session requires at least one resource:

receiving an acceptance by the invitee player; and based on the acceptance, establishing a communication between the video game console associated with the inviting player and the video game console associated with the invitee player;

detecting that the invitee player does not have at least one required resource to participate in the multiplayer game session; and based on the detection, maintaining communication between the respective video game consoles associated with the inviting player and the invitee player while concurrently:

receiving, by the one or more computing devices, an acceptance by the invitee player to purchase the at least one required resource; and based on the receiving of the acceptance by the invitee player to purchase the at least one required resource:

automatically downloading the at least one required resource to the video game console associated with the invitee player;

automatically installing the at least one required resource on the video game console associated with the invitee player; and initiating the multiplayer game session between the respective video game consoles associated with the inviting player and the invitee player.

* * * * *